United States Patent [19]

Intrater et al.

[11] Patent Number: 4,535,029

[45] Date of Patent: * Aug. 13, 1985

[54] METHOD OF CATALYZING METAL DEPOSITIONS ON CERAMIC SUBSTRATES

[75] Inventors: Josef Intrater, Englewood Cliffs, N.J.; Gene Bertoldo, New York, N.Y.

[73] Assignee: Advanced Technology, Inc., Palisades Park, N.J.

[ * ] Notice: The portion of the term of this patent subsequent to Nov. 9, 1999 has been disclaimed.

[21] Appl. No.: 532,618

[22] Filed: Sep. 15, 1983

[51] Int. Cl.$^3$ .......................... B32B 9/00; B32B 15/04
[52] U.S. Cl. ...................................... 428/408; 427/113; 427/383.3; 428/432; 428/433; 428/450; 428/457; 428/469; 428/698; 428/701
[58] Field of Search ............... 428/408, 457, 469, 698, 428/701, 432, 433, 450; 427/113, 383.3

[56] References Cited

U.S. PATENT DOCUMENTS 4,358,506 11/1982 Intrater et al. ...................... 428/408
4,374,903 2/1983 Intrater et al. .................. 428/457 X
4,376,806 3/1983 Intrater et al. ...................... 428/469
4,396,677 8/1983 Intrater et al. .................. 427/113 X

*Primary Examiner*—Thomas J. Herbert
*Attorney, Agent, or Firm*—Fred A. Keire

[57] ABSTRACT

Improved coating and method of forming a nondewettable coating in a reactive carbon monoxide atmosphere wherein a small portion of palladium, platinum or mixture thereof is added to the coating mixture before the mixture is applied to the substrate. Alternatively, in the case of electrolytic deposition, a thin layer of palladium, platinum or mixture thereof is, e.g. electrolessly or by sputtering or silkscreening, deposited on a substrate before a tin or tin alloy coating is deposited, such as by sputtering, silkscreening, etc. The reaction temperature required to form a nondewettable bond is reduced or increased depending on the tin alloy content, but it appears that if platinum or palladium is participating in the reaction for the same alloy, the temperature for achieving the bond appears to be reduced.

11 Claims, No Drawings

METHOD OF CATALYZING METAL DEPOSITIONS ON CERAMIC SUBSTRATES

BACKGROUND FOR THE INVENTION

Various methods of deposition of metals on ceramic bases are known in the art. Included among the most recent state-of-art methods are those disclosed in our U.S. Pat. Nos. 4,358,506; 4,396,677; 4,374,903, and 4,376,806. These methods have proven to be major advances in the chemical deposition of metals on ceramics. Nonetheless, these methods have been further improved by the invention as disclosed herein.

The methods disclosed in the above-mentioned patents comprised reacting a coated substrate in a CO or some other atmosphere containing CO as the reductant at temperatures ranging from about 850° C. to about 1000° C. to bond the coating to the substrate. The discovery of improvement has been occasioned by the following. First, at the higher reaction temperatures the decomposition temperatures are approached for some of the disclosed substrates. Conversely, the exposure time of the substrates must be very limited, or very rapid surface heating must be achieved. For some of the materials, due to phase changes, thermal expansion, etc., a specific rate of heating must be maintained, e.g. ferrites. Secondly, in that some of the disclosed substrates are oxides, reduction in a gas such as CO or a gas that contains or produces CO affects the substrate. The reaction of an oxide substrate in a reducing atmosphere at temperatures ranging from 600° C. to 1000° C. are generally well known and therefore need not be discussed herein. The present invention, however, eliminates the first of the above-mentioned problems and decreases the significance of the second, especially for substrates that are affected by carbon monoxide at lower temperatures. Moreover, preheating in an inert atmosphere, e.g. nitrogen helium and the like, also minimizes the problems with carbon monoxide attack on the substrate.

DESCRIPTION OF THE INVENTION

This invention relates to improvements in metal coatings and metal sandwiches. In our previous U.S. Pat. Nos. 4,358,506; 4,396,677; 4,374,903 and 4,376,806, we have disclosed various tin, lead or indium compositions with carbide or carbonyl formers for making adherent composites with carbon, such as graphite, diamond, etc., and other very hard to bond substrates. In addition, we have disclosed that these substrates, upon having tin, lead or indium compositions deposited thereon and being treated as disclosed in our previous U.S. patents, possess the heretofore unobserved ability to bond with other metals. We have also disclosed that when these and other substrates are employed with the metal being in sandwich form, such as nickel-copper-nickel, additional beneficial properties can be obtained. The above-identified patents are incorporated by reference herein.

We have further found that other metals alloyable with tin increase and decrease the temperature which the bond can tolerate, but that the bonding reaction nevertheless must be achieved at high temperature. Other tin alloys which may be used are given below. With tin being the balance, although a species of the alloy is given, the properly alloyable or powder forming and "alloyable" compositions are included pursuant to the teachings in our above-mentioned patents and their melting points. Thus these alloys are:

arsenic: 30% melting at 600° C.;
barium: 20% melting at 420° C.;
calcium: 15% melting at 600° C.;
lithium: 7% melting at 470° C.;
nickel: 30% melting at 795° C.;
strontium: 20% melting at 580° C.;
cerium: 30% melting at 1100° C.;
lanthanum: 30% melting at 1100° C.;
bithmuth: 25% melting at 139° C.;
cadmium: 20% melting at 170° C.;

We have now further found that when a small portion of platinum, palladium or a mixture thereof is added to the composition which comprises tin, lead or indium, as well as the other, above-mentioned alloys and carbide or carbonyl formers, and further platinum, palladium or mixtures thereof, the last appear to act as catalysts and/or promoters for reducing the temperature. When we state "catalysts" in this case, we intend to mean promoters of the reaction and/or reducers of temperature and not necessarily converters of one species of the alloy or reactant to the other. Moreover, we do not know the theoretical base for our invention disclosed herein. The reaction temperature required to bond the previously disclosed compositions to said hard-to-bond substrates, as disclosed in our patents, is reduced. This lower reaction temperature makes the coating process more economical, quicker to carry out and, more importantly, for reduction prone or sensitive substrates minimizes the attack by CO gas.

Inasmuch as our previous U.S. patents disclosed the full details of the various state of the art processes, as well as the carbide or carbonyl formers, the above listed U.S. patents are incorporated by reference herein and form part of this application.

The following further examples are illustrative of our broader invention and are to be construed as illustrations and not as limitations thereof.

EXAMPLE 1

When boron nitride is used as a substrate, an adherent coating, with a substantially void free interface, of tin-chromium composition (90% tin-8% chromium-2% platinum, by weight), forms on the surface of the boron nitride when reacted at a temperature of 1,000° C. in a 100% CO atmosphere. This composition will not dewet when a major portion of platinum or palladium is added and the tin-chromium composition and the reaction is then carried out. A reduced temperature appears to achieve complete bonding. It is essential, however, that carbon monoxide has access to the mixtures used for deposition, hence porous deposits, e.g. silkscreening, sputtering and the like are preferred.

EXAMPLE 2

When silicon carbide is used as a substrate, and a carbide or carbonyl former, such as chromium, titanium, hafnium, zirconium, cobalt, iron, nickel, manganese, rhenium, ruthenium, rhodium, osmium, iridium, vanadium, niobium, tantalum, tungsten, molybdenum, or mixtures thereof is mixed with tin, lead, indium or an alloy thereof, and a small portion of platinum or palladium (e.g. 0.1 to 2.0%, by weight), nondewettable coatings are formed when reacted at temperatures less than about 900° C.

For sensitive, e.g. oxide containing substrates, the initial, but not tightly adhering, coating process can also be carried out by means of electrolytic or sputtering deposition. With any of the previously disclosed substrates selected to act as the cathode, an appropriate tin, lead or alloy deposit is formed thereon. Typically, a very thin layer of palladium, platnium or mixture may be electrolessly deposited on the substrate to provide a conductive substrate thereon by one of many well known methods for electroless deposition.

Other electroless, flash deposits may be copper, silver, nickel, etc. The "flash" deposited, e.g. palladium or platinum coated cathode, is then immersed in an electrolytic bath comprising a mixture of tin, lead, indium, or one of the alloys above, a small portion of platinum, palladium or mixture thereof, if further added, and a carbide or carbonyl former in their elemental form. Also immersed in the electrolytic bath is a conventional anode. A layer of the mixture is then electrolytically deposited on said cathode by appropriately impressing a direct current between the anode and cathode which electrolyzes the electrolytic solution and causes deposition on the cathode. Lastly, the cathode is then removed from the electrolytic bath, is washed, dried and reacted in an atmosphere containing carbon monoxide at a lower temperature to form a nondewettable coating, film or layer on said substrate. If said first thin layer of palladium, platinum or mixture thereof is flash deposited on the substrate, there may be no need to add palladium, platinum or a mixture thereof into the electrolytic bath mixture. This can be found by appropriate adhesion criteria for the substrate sought to be covered.

Appropriate bath mixtures which achieve the above deposition are found in numerous handbooks and are selected to best suit the final composition desired on the substrate. Substrates may also be masked to form a circuit pattern, then electrolessly trated, then electrolytically treated, and finally reacted in a CO containing atmosphere. Under all conditions, the presence of a reducing CO gas is important. Inasmuch as CO causes the metal to spread and flow over the substrate, it is important that the pattern deposited on the substrate is appropriately undersized and not thick, e.g. of the order of 2 mils. It has also been found that if a deposit is pressed and if CO has access to it, then the flow of the material is impeded, but the pressing material may have to be selected so as not to bond to the deposit. This fact shows the ready penetration of the CO gas into the deposit, and the flow characteristics of the tin, etc. Treatment with CO also provides for healing of any imperfection, holes, etc., at the same time establishing the exceptionally adherent coating on the substrate.

As it can now be appreciated, if the right, e.g. tin, lead, and the other alloy composition of tin has been sputtered, electrolessly or electrolytically deposited, conjointly or sequentially, on the substrate, the access to CO provided, then treatment in CO atmosphere also can be used to improve the deposit of any layer, grid, pattern, etc., deposited on a substrate.

As the reducing atmosphere affects the substrate, an electroless or electrolytic deposition of it, then masking, then electrolytically depositing, then mask stripping, then CO treatment as described above, and finally back etching, will also allow the use of the CO gas with these sensitive substrates.

Any other masking procedure which minimizes the exposed but CO sensitive material to the reductive action of CO may be employed. For example, zinc oxide current limiters may be masked or preheated in helium atmosphere, then exposed for a brief period to the CO atmosphere and then bonded with the material.

What is claimed is:

1. A composite of tin, lead, indium, a tin alloy, a lead alloy, an indium alloy, or a mixture thereof as a component in combination with a carbide or carbonyl fomer and a small portion of about 2%, by weight, platinum, palladium or mixture thereof as a catalyst for improving an adherent coating, film or layer and wherein the balance, by weight, is said coating, on a base or substrate of a carbon, diamond, silicon, carbide, alumina, zirconia, sapphire, quartz, graphite, nitride, oxide, arsenide, titanate, silicide, boride, telluride, phosphide, pyrolitic graphite, silicon carbide, boron carbide, a mixed carbide, tungsten carbide, oxides of metals or metalloids, aluminum gallium arsenide, gallium arsenide, gallium phosphide, lanthanum boride, barium titanate, zirconium ortho silicate, zinc oxide, magnesium silicate, aluminum silicate, silicon nitride, beryllium oxide, boron nitride or titanium diboride.

2. A composite as defined in claim 1 wherein said carbide or carbonyl former is chromium, titanium, hafnium, zirconium, cobalt, iron, nickel, manganese, rhenium, ruthenium, rhodium, osmium, iridium, vanadium, niobium, tantalum, tungsten, molybdenum or a mixture thereof.

3. A composite as defined in claim 1 wherein said small portion of platinum, palladium or mixture thereof is approximately 0.1 to 2%, by weight, of the coating, film or layer.

4. In a method of bonding a coating to a substrate wherein said coating comprises a component of tin, lead, indium, a tin alloy, a lead alloy, an indium alloy or a mixture thereof and a carbide or carbonyl former, wherein the coating is applied to said substrate and wherein the substrate is then heated in a CO atmosphere to effect a bonding reaction, wherein the improvement comprises:

incorporating in said coating in an amount up to about 2%, by weight, said coating being CO accessible, a small catalytically sufficient portion of platinum, palladium or a mixture thereof before said coating and said substrate are reacted in said CO atmosphere, and reacting in presence of CO at a temperature up to about 1000° C., for a time sufficient to cause adhesion of said coating to said substrate.

5. A method as defined in claim 4 wherein said small portion of platinum, palladium or mixture thereof is approximately 0.1 to 2%, by weight, of said coating.

6. In a method for forming a composite whereby at least one substrate is coated with a bonding composition of tin, lead, indium, a tin alloy, a lead alloy, an indium alloy, in combination with a carbide or carbonyl former in a carbon monoxide atmosphere to effect a bonding reaction and to form a coated substrate, the improvement comprising:

forming conjointly or separately by sputtering, vapor deposition, electroless or electrolytic deposition, a thin layer on said substrate, said thin layer being comprised of platinum or palladium or mixtures thereof in an amount of up to about 2% by weight, balance of said tin, lead, indium, tin alloy, a lead alloy, an indium alloy or mixtures thereof and said carbide or carbonyl former; and reacting, in an atmosphere comprising carbon monoxide, said thin layer with at least one substrate at a temperature sufficient to form and adherent composite including up to about 1000° C., said thin layer being carbon monoxide accessible during said reaction in said atmosphere comprising carbon monoxide.

7. A method of forming a composite as defined in claim 6 wherein said substrate is a composite of tin, lead, indium, a tin alloy, a lead alloy, an indium alloy, or a mixture thereof as a component in combination with a carbide or carbonyl former and a small portion of platinum, palladium or mixture thereof in an amount up to 2%, by weight, as an adherent coating, film or layer on a base or substrate of a carbon, diamond, silicon, carbide, alumina, zirconia, sapphire, quartz, graphite, nitride, oxide, arsenide, titanate, silicide, boride, telluride, phosphide, pyrolitic graphite, silicon carbide, boron carbide, a mixed carbide, tungsten carbide, oxides of metals or metalloids, aluminum gallium arsenide, gallium arsenide, gallium phosphide, lanthanum boride, barium titanate, zirconium ortho silicate, zinc oxide, magnesium silicate, aluminum silicate, silicon nitride, beryllium oxide, boron nitride or titanium diboride.

8. A method of forming a composite as defined in claim 6 wherein said carbide or carbonyl former in a combination as defined in claim 1 is chromium, titanium, hafnium, zirconium, cobalt, iron, nickel, manganese, rhenium, ruthenium, rhodium, osmium, iridium, vanadium, niobium, tantalum, tungsten, molybdenum or a mixture thereof.

9. A method of forming a composite as defined in claim 6 wherein said atmosphere is carbon monoxide in admixture with an inert gas.

10. A method of forming a composite as defined in claim 6 wherein said coated substrate is reacted at less than 950° C.

11. The method as defined in claim 6, wherein the substrate is only partially covered with a composition of tin, lead, indium or an alloy thereof containing said carbide or carbonyl former and platinum or palladium as a catalyst and the partial deposit is treated for adhesion improvement in an atmosphere containing CO.

* * * * *